United States Patent

Jarvik

[11] Patent Number: 6,070,987
[45] Date of Patent: Jun. 6, 2000

[54] HAND HELD ILLUMINATED POINTER

[76] Inventor: Jonathan Wallace Jarvik, 6419 Beacon St., Pittsburgh, Pa. 15217

[21] Appl. No.: 08/991,534

[22] Filed: Dec. 16, 1997

[51] Int. Cl.[7] ................ F21V 33/00; F21L 7/00
[52] U.S. Cl. ................ 362/84; 362/109; 362/102
[58] Field of Search ............... 362/84, 102, 184, 362/800, 197, 198, 186, 202

[56] References Cited

U.S. PATENT DOCUMENTS

| | | | |
|---|---|---|---|
| 4,678,450 | 7/1987 | Scolari et al. | 362/202 |
| 5,012,394 | 4/1991 | Woodward | 362/198 |
| 5,081,568 | 1/1992 | Dong et al. | 362/102 |
| 5,552,971 | 9/1996 | Madden | 362/61 |
| 5,588,735 | 12/1996 | Harada | 362/102 |
| 5,607,226 | 3/1997 | Toth et al. | 362/102 |
| 5,622,423 | 4/1997 | Lee | 362/102 |
| 5,697,695 | 12/1997 | Lin et al. | 362/102 |

*Primary Examiner*—Thomas M. Sember

[57] ABSTRACT

A hand-held illuminated presentation pointer is described. In a lighted room, the pointer has all of the advantages of a conventional pointing rod. In a darkened room, the pointer can be illuminated so that it emits light from just one side of the shaft. When used in conjunction with a projected image such as from a 35 mm slide, the pointer is held so that illuminated side of the shaft faces the audience, with the result that the pointer is clearly visible as a glowing line in front of the projected image, and yet the appearance of the image is unaffected. Smaller illuminated pointers for use at close range are also described.

4 Claims, 3 Drawing Sheets

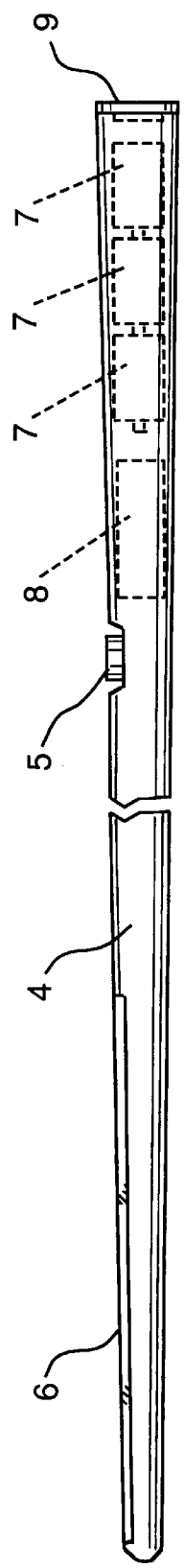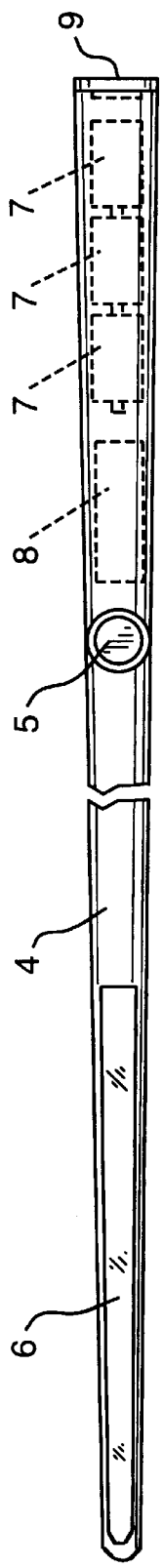

HAND HELD ILLUMINATED POINTER

CROSS REFERENCES TO RELATED APPLICATIONS

U.S. Patent Documents

| | | | |
|---|---|---|---|
| 2,108,802 | 1938, February | 362/102 | (conductor's baton) |
| 4,231,077 | 1977, October | 362/32 | (light toy) |
| 4,678,450 | 1987, July | 446/405 | (toy light sword) |
| 5,036,442 | 1991, July | 362/102 | (illuminated wand) |
| 5,081,568 | 1992, January | 362/184 | (traffic police baton) |
| 5,212,333 | 1993, May | 84/447B | (conductor's baton) |

BACKGROUND OF THE INVENTION

1. Field of the Invention

This invention relates to presentation pointers, i.e., pointers that are used in visual presentations to an audience or to an individual. More specifically, it is directed to presentation pointers that use light to focus the viewer's attention to a particular part of the field of view. an ordinary pointer is ineffective because the audience cannot see it, and as result the intended effect of directing the audience's attention to a particular word or group of words is frustrated.

As aids to allow a presenter to point to a projected image in a darkened room, there exist a variety of hand-held "projection pointers" that direct a beam of light onto a portion of the image in order to bring it to the attention of the audience. In some of these projection pointers ("incandescent projection pointers") the beam comes from an incandescent lamp whose light is collimated by mirrors and/or lenses; in others ("laser pointers") the light source is a laser diode.

Hand-held Projection pointers have a number of disadvantages, including:

(a) Small movements of the presenter's hand are amplified and cause the beam to dance about on the screen in a distracting manner.

(b) The beam emitted from an incandescent projection pointer is frequently not bright enough to be seen well, especially if the relevant portion of the image is bright or the room is not totally dark.

(c) The bulb in an incandescent projection pointer can burn out and is subject to breakage if the device is dropped or handled roughly.

(d) Laser pointers typically cast a small spot of light that can be hard to see clearly.

(e) Laser pointers typically produce monochromatic deep red light, and, as a result of chromatic aberration intrinsic to the human eye, the spot of light, though actually sharp, appears indistinct and blurry.

(f) Laser pointers pose a health hazard in that they can produce retinal damage if pointed directly into the eye, even from a distance.

(g) Projection pointers lose their utility when the room is bright, and so, if only part of a presentation is held in darkness or semi-darkness, the presenter may need to switch repeatedly between a projection pointer and a pointing rod during his or her presentation.

In view of the disadvantages cited above, there exists a need for an improved illuminated pointer that works by lighting up rather than by projecting light on the subject. In fact, a pointer with a red light emitting diode at its tip has been commercially available for some time from the Apollo Corporation of Farmingdale, N.Y. Unfortunately, this pointer has a number of liabilities of its own. First, the diode casts light in all directions, with the greatest intensity in the direction corresponding to the pointer's long axis. As a result, when it is pointed at a portion of a projected image, it casts unwanted light upon the screen, thereby washing out the very portion of the image that the presenter wishes to highlight. The diode is also unitary and small, and its red color makes it appear blurry due to the natural chromatic aberration of the human eye. Thus, like the projection pointers discussed previously, this device has limitations that severely limit its usefulness.

In the instant application, a rod-shaped presentation pointer that lacks the liabilities inherent in presently existing pointers is described. This pointer lights up (glows) in the dark, but, because it can be illuminated on only one side of the shaft, it can be held so as to cast light towards the audience and not upon the projected image that is being pointed to. As a result, the pointer is clearly visible in the dark, and at the same time the image that it is pointing to remains clear and unaltered. Furthermore, when the room lights are on, the device can be used effectively as a traditional non-illuminated pointer.

Not only is there a need for a better illuminated presentation pointer for use in lectures, seminars, sales presentations, court cases, and the like, but there is also a need for an illuminated pointer for use at close range in more intimate circumstances. For example, when a one physician is discussing an X-ray with another physician, there is a frequent need to use a pointer of some kind. In these situations, a pen or pencil is often recruited to the task. In this situation, as in larger scale presentations to multiple individuals, there is a clear need for a pointer that is illuminated but does not cast unwanted light directly on the X-ray film.

In some circumstances, a pointer that is illuminated on one side can be used to advantage when held with the illuminated portion facing away from the viewer. In this case, the pointer serves to cast diffuse low-glare light on the object, and at the same time the pointer is seen in sillhoutte against the lighted object and can be used effectively to point out a particular feature or features. This is true not only in presentations to a viewer or audience, but when the device is employed by a lone user. For example, if a small embodiment of the device is used to locate and point to a door lock at night, it is advantageous to have the side facing the user dark, lest light from the pointer "blind" the user and inhibit seeing the lock.

The prior art includes a number of "light wands". None of them, however, is intended for use as a presentation pointer, and none of them emits light from just one side of the shaft as in the instant invention; in fact they are designed to provide 360 degree visibility of the light. Some of these light wands are toys or novelty items (U.S. Pat. Nos. 4,230,077 and 4,678,450). Others are designed for use as warning or traffic directing devices (U.S. Pat. Nos. 5,036,442 and 5,081,568). Still others are intended for use in conducting bands or orchestras (U.S. Pat. Nos. 2,108,802 and 5,212,333).

OBJECTS AND ADVANTAGES OF THE INVENTION

Among the objects and advantages of the present invention are:

a) To provide a hand-held illuminated pointer that allows a presenter to call an audience's attention to a particular object, or the projected image of an object, within a dimly or variably illuminated field of view by directing the pointer towards the object and causing it to emit light from a portion of its surface so that it can be readily seen by the audience.

b) To provide a hand-held illuminated pointer that can cast light in the direction of the viewer and not upon the object that is being pointed to. This is of particular importance with projected images in a dark room, since the contrast of the image is compromised if diffuse light falls from the pointer onto the screen and reflects back towards the audience, thereby degrading the very portion of the image upon which attention is to meant be brought. With its light cast towards the audience and not the screen, the pointer appears as a glowing line in front of a the otherwise unaffected projected image.

c) To provide a hand held illuminated pointer that can cast light towards an object and away from the viewer.

d) To provide a hand-held illuminated pointer that retains the advantages of a traditional non-illuminated pointer when used in a brightly lit environment.

e) To provide a hand-held illuminated pointer that cannot cause retinal damage to the user or audience.

DRAWING FIGURES

FIGS. 1, 2 and 3 show a preferred long embodiment of the invention.

FIG. 1 shows a view of the pointer in a lighted environment. The switch is not visible in this rendering, as it is located under the user's thumb.

FIGS. 2 and 3 show top and side views, respectively, of the same embodiment.

REFERENCE NUMERALS IN DRAWINGS

4. Shaft
5. Switch
6. Electroluminescent lamp
7. Battery
8. Electrical inverter
9. Battery chamber door

DESCRIPTION—FIGS. 1–5

Figure 1:
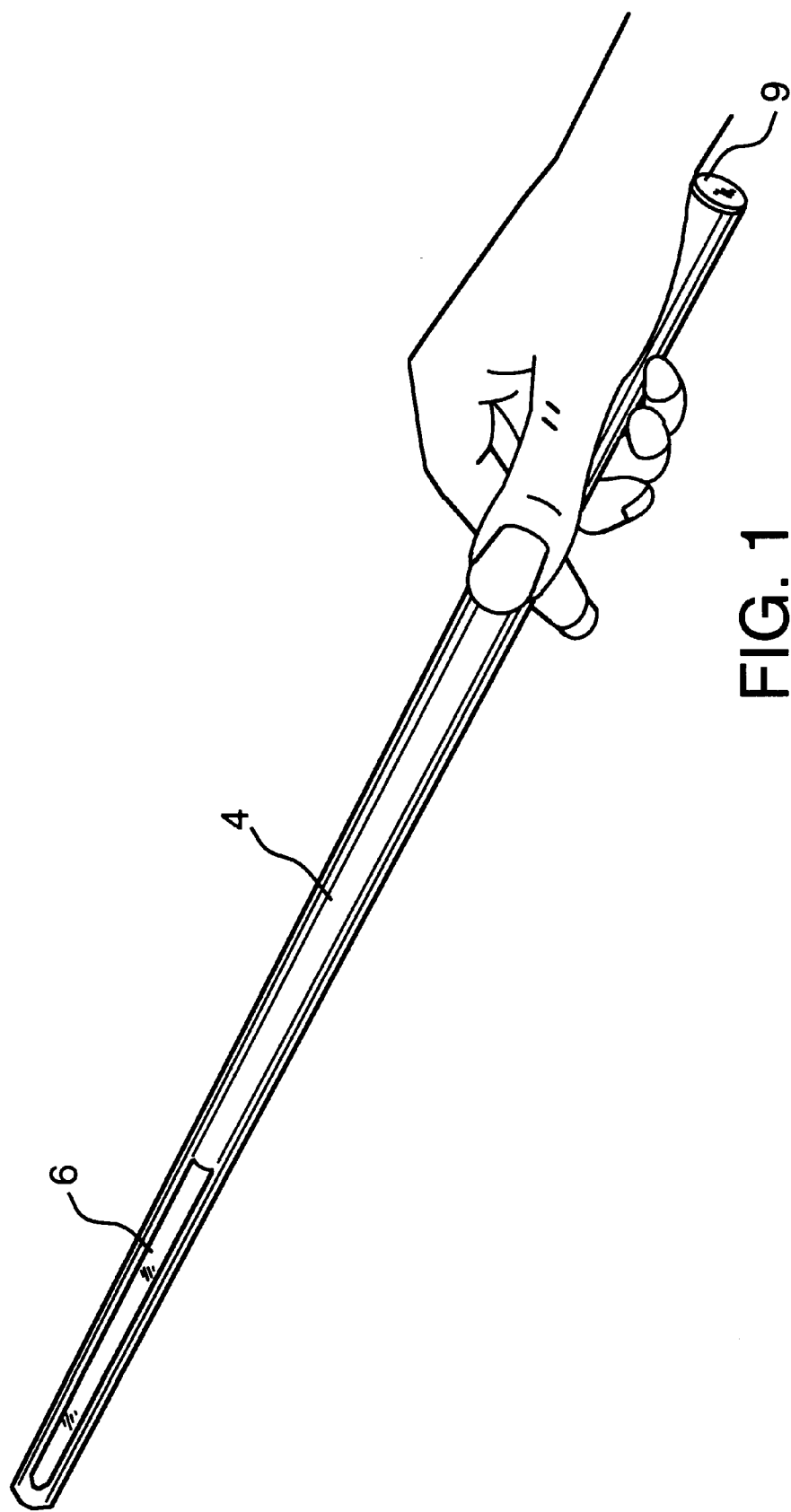
Figure 4:
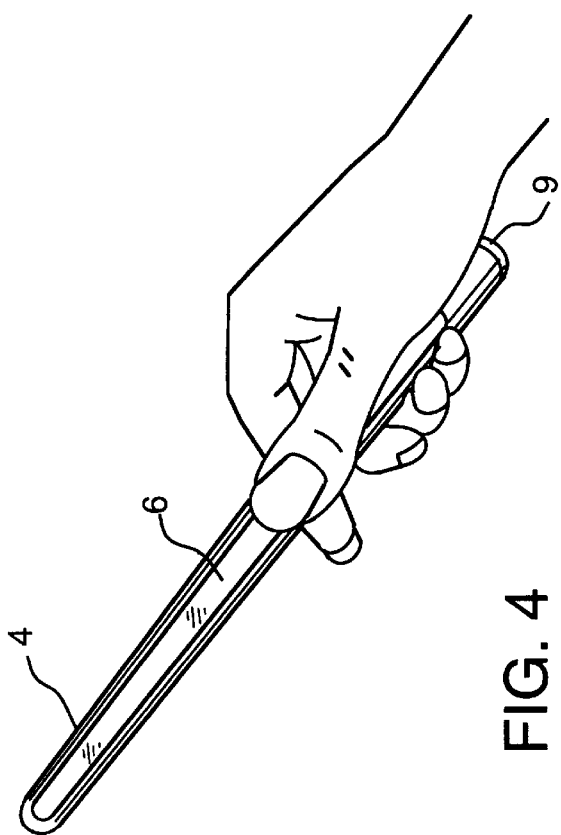
FIGS. 4 and 5 show two preferred short embodiments of the invention. The switch is not visible because it is located under the electroluminescent lamp below the user's thumb.
Figure 5:
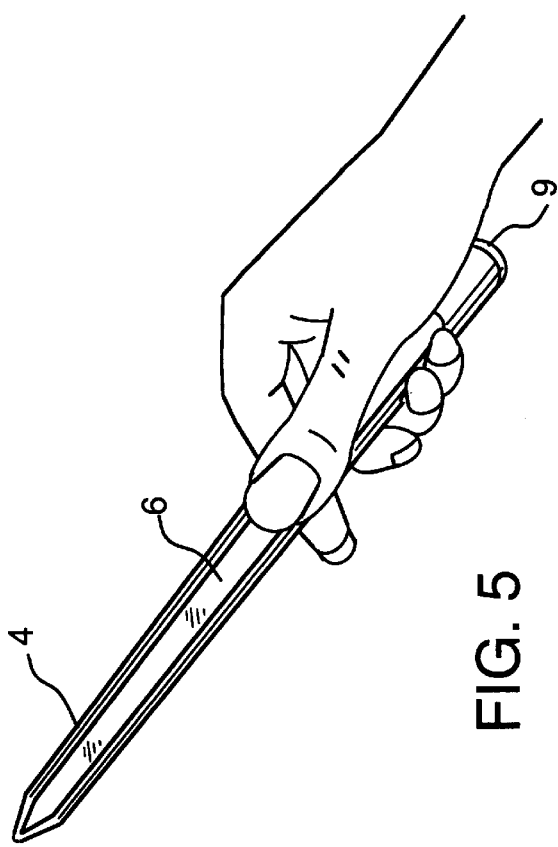

A preferred embodiment of the instant invention for use in a lecture or seminar setting is depicted in FIGS. 1 through 3. The tapered cylindrical shaft 4 is composed of injection molded plastic. It is hollow along most of its length, both to provide light weight and to accommodate three type N batteries 7 and an electrical inverter 8 in the handle. The inverter delivers alternating current to an electroluminescent lamp 6 affixed to one side of the distal portion of the shaft. A finger operated pressure switch 5 is provided so that the user can control the illumination of the device. Access to the battery chamber in the handle is provided by a door 9 so that the batteries can be replaced when their charge is exhausted. Two preferred small embodiments are depicted in FIGS. 4 and 5.

OPERATION OF THE INVENTION

The operation of the invention is simple and natural. One simply holds it as one would hold a standard nonilluminated pointing rod and depresses the switch with a finger or thumb to illuminate the lamp.

SUMMARY AND SCOPE

In conclusion, the instant invention provides an illuminated pointer that overcomes many disadvantages of the pointers that are presently available and that has unique advantages of its own. It is easy to use; it is readily seen by the audience; and it enhances the effectiveness of presentations large and small.

Many variations on the embodiments described here—for example: pointers that can be extended, shortened or folded, pointers with adjustable illumination intensity, pointers that are illuminated in multiple colors, pointers that display kinetic illumination patterns, pointers that remain lit for an interval of time after being turned on, pointers that turn on automatically when picked up or when held at a certain angles relative to horizontal, pointers that may be illuminated from one side or multiple sides as the user wishes, pointers with chemiluminsecent or other non-electrical illumination means, and hybrid pointers that incorporate writing implements or laser pointers in their shafts, will occur to one practiced in the appropriate arts. Furthermore, uses other than those described previously, such as use by a director or prompter in a darkened theater, will also occur to one skilled in the appropriate arts. Thus the scope of the invention should be determined by the appended claims and their legal equivalents, rather than by the particular embodiments and examples given here.

I claim:

1. A hand-held illuminated pointer comprised of a) an elongated hollow or partially hollow shaft, and b) an electrical battery housed within said shaft, and c) an electrical inverter housed within said shaft, said inverter connected by electrically conducting material to said battery, and d) an electroluminescent lamp affixed in longitudinal orientation along a portion of said shaft, said lamp being no wider than the shaft and being connected to said electrical inverter by electrically conducting material, and e) an electrical switch in the electrically conducting material between said lamp and said battery.

2. The pointer of claim 1 in which said shaft varies in thickness.

3. The pointer of claim 1 in which said electrical switch is selected from the group consisting of: momentary switch, on-off switch, membrane switch, mercury switch, pressure switch, variable-resistance switch.

4. The pointer of claim 1 in which said shaft is of a length chosen from the following group: 4 to 12 inches; 12 to 24 inches; 24 to 48 inches.

* * * * *